(12) United States Patent
Schroeder et al.

(10) Patent No.: US 8,237,419 B2
(45) Date of Patent: Aug. 7, 2012

(54) MICROCONTROLLER OPERATED CURRENT LIMITED SWITCHING POWER SUPPLY FOR CIRCUIT PROTECTIVE DEVICES

(75) Inventors: Jeremy D. Schroeder, North Liberty, IA (US); John K. Mackenzie, Raleigh, NC (US); Brett Larson, Cedar Rapids, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 595 days.

(21) Appl. No.: 12/380,484

(22) Filed: Feb. 27, 2009

(65) Prior Publication Data

US 2010/0220507 A1  Sep. 2, 2010

(51) Int. Cl.
  *G05F 1/569* (2006.01)
  *G05F 1/567* (2006.01)
  *G05F 1/573* (2006.01)
(52) U.S. Cl. .......................... 323/277; 323/276; 363/89
(58) Field of Classification Search .................. 323/273, 323/275–277; 363/89
See application file for complete search history.

(56) References Cited

U.S. PATENT DOCUMENTS

| | | | |
|---|---|---|---|
| 4,992,723 A * | 2/1991 | Zylstra et al. | 323/324 |
| 5,126,652 A * | 6/1992 | Carlin | 323/267 |
| 6,198,262 B1 * | 3/2001 | Squibb et al. | 323/273 |
| 6,304,465 B1 * | 10/2001 | Takita | 363/37 |
| 6,469,920 B2 * | 10/2002 | Butler et al. | 363/89 |
| 6,577,485 B2 | 6/2003 | Reid et al. | |
| 6,650,099 B2 | 11/2003 | Mitamura et al. | |
| 7,233,112 B2 | 6/2007 | Burke et al. | |
| 7,894,216 B2 * | 2/2011 | Melanson | 363/21.13 |
| 2007/0114981 A1 * | 5/2007 | Vasquez et al. | 323/266 |
| 2009/0168477 A1 * | 7/2009 | Fenton et al. | 363/89 |
| 2010/0067270 A1 * | 3/2010 | Odell | 363/89 |

* cited by examiner

*Primary Examiner* — Adolf Berhane
*Assistant Examiner* — Gary Nash
(74) *Attorney, Agent, or Firm* — Nixon Peabody LLP

(57) ABSTRACT

An AC to DC power supply for small heat sensitive electronic device. The power supply being dynamically controlled to operate symmetrically about the lowest point of the AC source voltage waveform for minimum excess heat production.

12 Claims, 4 Drawing Sheets

MICROCONTROLLER OPERATED CURRENT LIMITED SWITCHING POWER SUPPLY FOR CIRCUIT PROTECTIVE DEVICES

CROSS-REFERENCE TO RELATED PATENTS

Not applicable

STATEMENT REGARDING FEDERALLY SPONSORED RESEARCH OR DEVELOPMENT

Not applicable

FIELD OF THE INVENTION

The present invention relates to power supply and particularly to DC power supplies for small heat sensitive devices.

BACKGROUND OF THE INVENTION

As electronic devices become smaller, a need for compact power supplies is growing. In many cases the area provided for the power supply is extremely small and surrounding components can be extremely sensitive to heat produced by the power supply. Therefore, it is desirable to have a small, low component count, cool running power supply capable of producing sufficient DC power for compact electronic devices from an AC power source.

SUMMARY OF THE INVENTION

The present invention provides a small, economical and highly efficient switching power supply for use in electronic trip units, self powered overload relays, arc and ground fault protection devices and similar small thermally sensitive electronic applications. The power supply is dynamically controlled by a microprocessor and has a low component count permitting it to operate in confined spaces with minimal heat output. Efficiency is maintained by operating at the lowest point of the AC voltage waveform, symmetrically around the AC line zero crossing point.

BRIEF DESCRIPTION OF THE DRAWINGS

The features of the invention will be more clearly understood from the following detailed description of the invention read together with the drawings in which.

Figure 1:
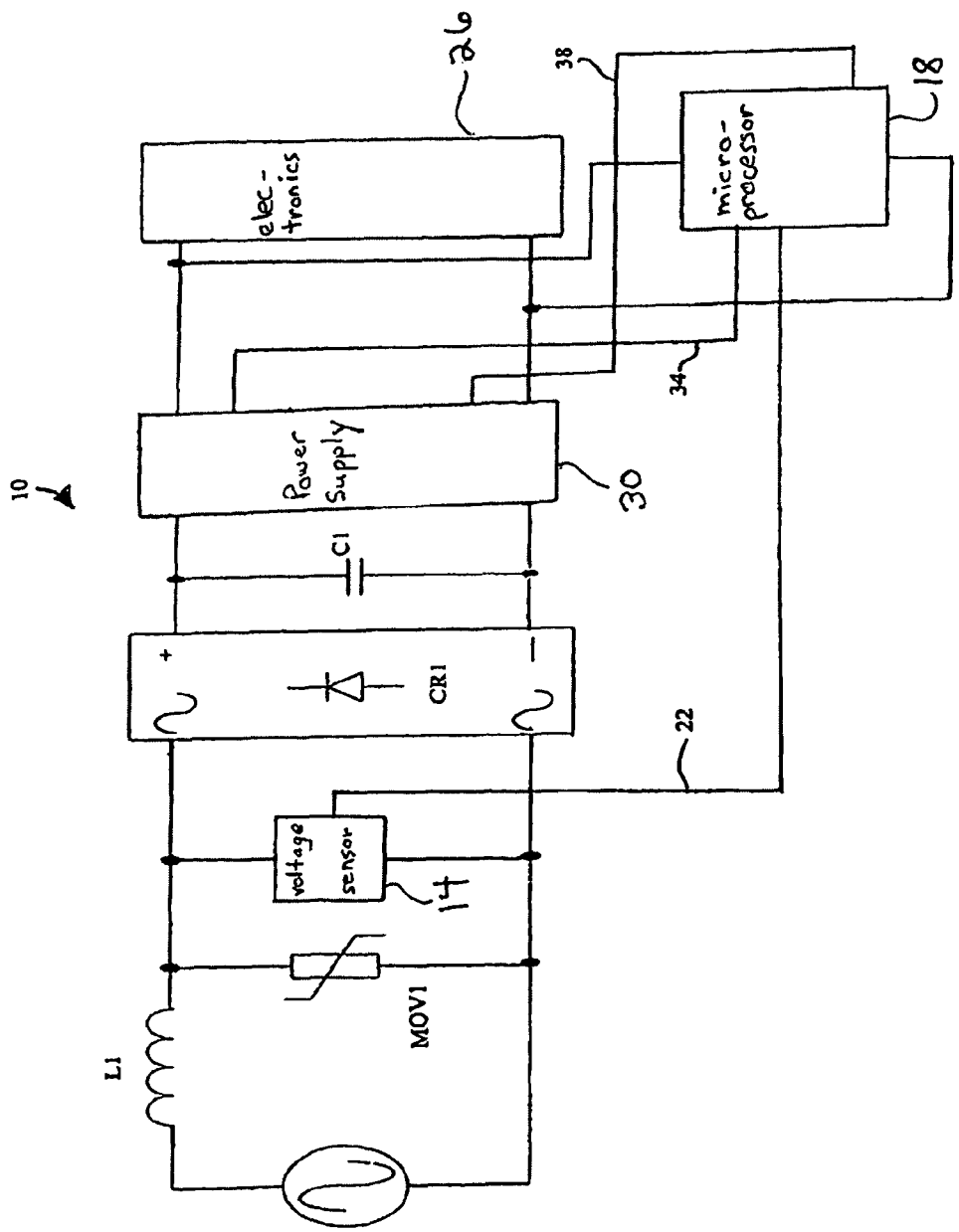
FIG. 1 is a block diagram of a circuit for a circuit protection device completely controlled by a microprocessor including a thermally efficient power supply

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates in block form, a circuit, generally indicated by reference numeral 10, for a circuit protection device such as a ground fault circuit breaker, arc fault circuit breaker, electronic trip unit, self powered current overload detector or other circuit interrupting protective device. Since some protective devices such as circuit breakers and ground fault receptacles are small and sensitive to heat, protective circuit 10 must use the fewest number of components possible and produce the least amount of heat possible. Therefore, some components of the protective circuit 10 must perform more than one function. The trip solenoid L1 of the protective device also functions as an impedance bump for surge suppressor MOV1, with capacitor C1 it forms an LC filter to smooth out the full wave rectified AC voltage from the full wave bridge CR1 and also functions as a source inductor for a power supply 30. Capacitor C1 also provides some additional energy storage and suppresses high frequency transients. The power supply 30 provides power to all or the electronics, generally indicated by reference numeral 26, of the protection circuit 10, including the fault sensing circuits, the trip circuit, and a microprocessor 18. The microprocessor 18 controls all aspects of the protective device electronics including dynamic control of the power supply circuit 30 via sensing line 34 and control line 38. An AC source voltage sensor 14 monitors the condition of the AC source voltage and provides information about the AC source voltage to the microprocessor 18 via sensing line 22. The power supply 30 is constructed in accordance with the present invention and described in detail below.

Figure 2:
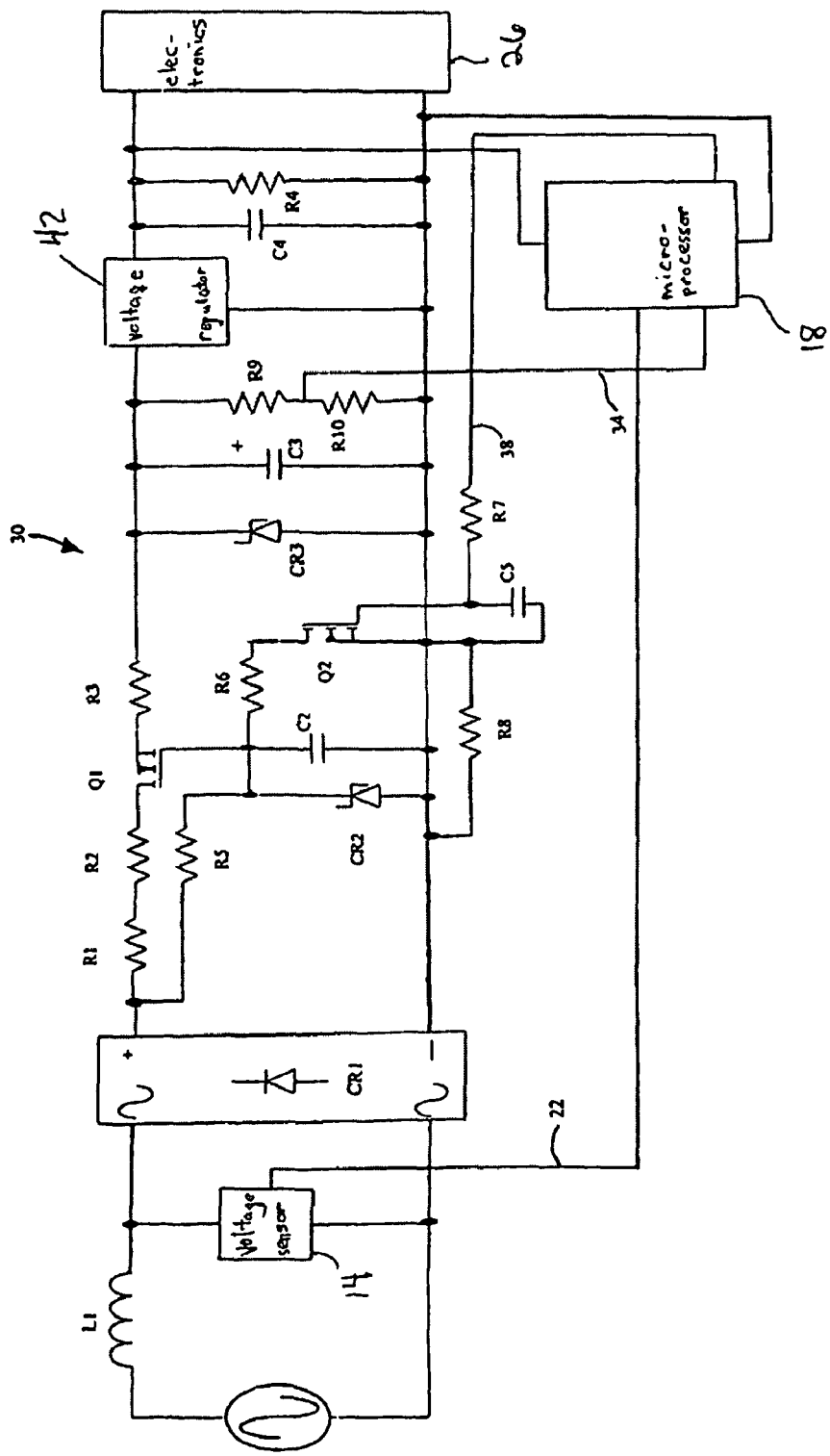
FIG. 2 is a circuit diagram of a thermally efficient power supply constructed in accordance with the present invention.

FIG. 2 illustrates in detail an embodiment of the power supply circuit 30. The power supply circuit 30 must be capable of providing sufficient operating power to all of the electronics of the protective circuit 10 using the least number of components and producing the least amount of heat possible. The power supply 30 is an AC to DC switching power supply for converting 120 Vac single phase 50/60 Hz line voltage (49-132 Vac range) to a nominal DC voltage determined by components of the power supply. The microprocessor 18 uses an internal analog to digital converter (ADC) to monitor the input of a voltage regulator 42 via sensing line 34. The monitored input voltage also represents an unregulated voltage charge on power supply capacitor C3.

When power is initially applied to the protective circuit 10 from the AC source, power supply switch Q1 will be biased ON by the charging of capacitor C2 through resistor R5 to a voltage determined by Zener diode CR2. With rectified power from the AC source passing through power supply switch Q1, power supply capacitor C3 will begin to charge and power will also be applied to the voltage regulator 42. The voltage regulator 42 charges regulated power supply capacitor C4 to the regulated voltage, and microprocessor 18 begins to function. From this point on the microprocessor 18 will monitor the charge on power supply capacitor C3 via sensing line 34 and control the operation of the power supply 30 as described below until power from the AC source is interrupted.

Figure 4:
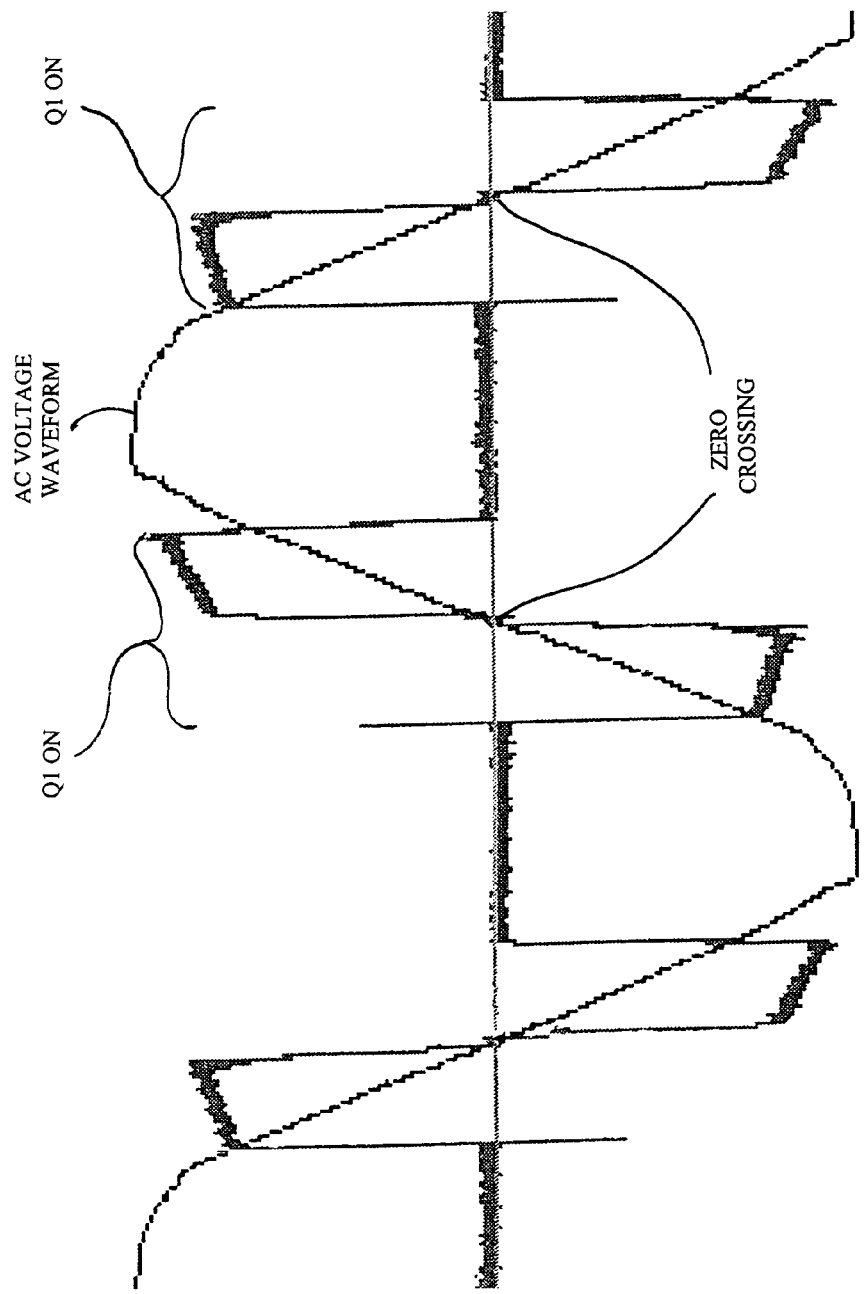
FIG. 4 is a graph showing the relationship of the AC source voltage waveform and the current through switch Q1.

After the microprocessor 18 powers up it begins to dynamically adjust the ON time of power supply switch Q1 symmetrically about the zero crossing of the voltage waveform by controlling the ON and OFF time of control switch Q2 via control line 38. In the following description, for any switch, ON and CLOSED are equivalent states and OFF and OPEN are equivalent states, The amount of time power supply switch Q1 is ON symmetrically about the zero crossing of the voltage waveform is determined by the charge on power supply capacitor C3. This charge is monitored via sensing line 34. The ON time of power supply switch Q1, symmetrically about the zero crossing of the voltage waveform, is therefore dynamically adjusted by control switch Q2 via control line 38 such that power supply capacitor C3 is provided with enough current to maintain a predetermined minimum charge level. Control switch Q2 controls power supply switch Q1 by draining the bias voltage from the base of power supply switch Q1 causing switch Q1 to turn OFF. The OFF and ON time of control switch Q2 is therefore based on the charge level of power supply capacitor C3. When power supply switch Q1 OPENS, rectified power from the AC source is removed from power supply capacitor C3 and voltage regulator 42. During the OFF period of power supply switch Q1 the power to the regulator 42 is supplied by power supply capacitor C3. The dynamically adjusted ON time duration of power supply switch Q1 symmetrically about the zero crossing of the voltage waveform is determined by the microprocessor 18, until the AC power source is removed from the protective circuit 10. The microprocessor 18 monitors the AC source voltage waveform via sensing line 22 to determine when the next zero crossing is approaching. When the microprocessor 18 dynamically adjusts the ON time of power supply switch Q1 via control switch Q2 and control line 38 based on the voltage level on power supply capacitor C3, the microprocessor 18 determines the minimum time required to charge the power supply capacitor C3. The microprocessor 18 then initiates closing of power supply switch Q1 at the lowest possible voltage point of the AC source voltage waveform at which sufficient time for the charging the power supply capacitor C3 and powering the protective circuit 10 can be obtained. The point of the AC source voltage waveform selected by the microprocessor 18 to initiate closing of power supply switch Q1 is such that the power supply switch Q1 will be CLOSED during a generally symmetrical portion of the AC source line around its zero crossing as shown in FIG. 4.

Other components of the power supply 30 are selected to reduce the heat produced by the power supply 30. Voltage dropping resistors R1 and R2 are selected to reduce the voltage drop across power supply switch Q1 and to more evenly dissipate heat in the power supply circuit 30. The value of resistor R3 is selected to limit the maximum current that will flow through solenoid L1 and power supply switch Q1. When power supply switch Q1 is ON the voltage at the source of power supply switch Q1 will be equal to the Zener voltage of Zener diode CR1 minus the gate-source voltage of power supply switch Q1. While power supply switch Q1 is conducting, power supply capacitor C3 will be charging up from its predetermined minimum voltage level to a voltage level where it is clamped by Zener diode CR3. Thus the range of the voltages on either side of resistor R3 is known. Resistor R3 and the resistance of the conducting power supply switch Q1 determines the maximum current that will flow through trip solenoid L1 and power supply switch Q1. Therefore, the value of R3 can be selected to prevent excessive heat dissipation by the power supply switch Q1 and resistors R1, R2 and R3. Zener diode CR1 prevents the voltage level of power supply capacitor C3 from reaching levels that could damage the circuit and provides the initial bootstrap voltage necessary to start the microprocessor 18.

Figure 3:
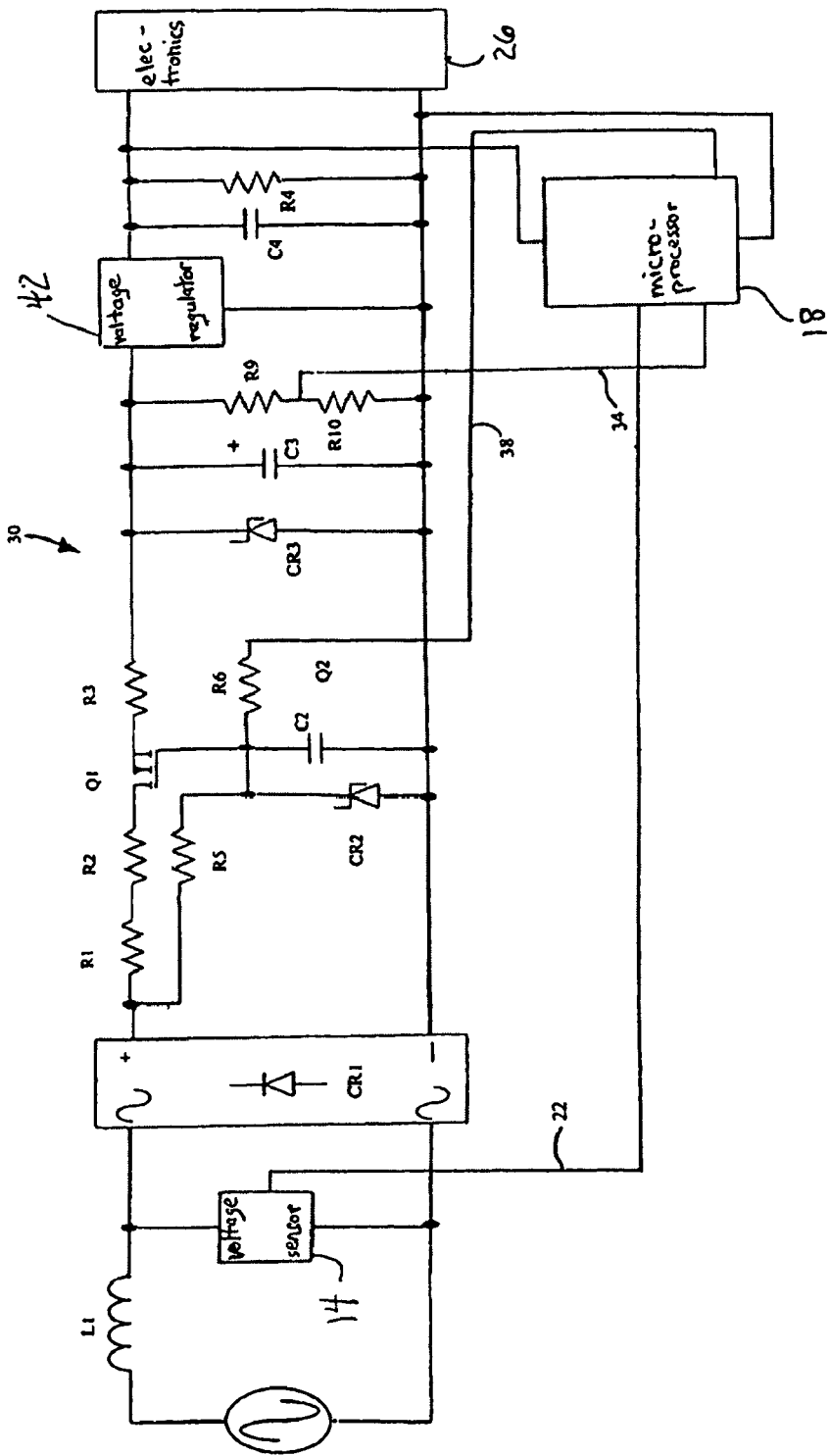
FIG. 3 is a second embodiment of the power supply circuit of FIG. 1.

FIG. 3 illustrates the circuit for a second embodiment of the power supply 30, in which the microcontroller 18 includes an open-drain/collector (ODC) output. By connecting the open-drain/collector output to the base of power supply switch Q1, control switch Q2, capacitor C5 and resistors R7 and R8 can be eliminated. This reduces the component count and may slightly increase the thermal efficiency by eliminating the voltage drops of Q2, R7 and R8.

During a fault condition or voltage sag, the AC source voltage may fluctuate rapidly or drop to a level not sufficient for operating some electrical devices. Either of these conditions can severely limit the available power near the zero crossing. Since the microprocessor 18 also monitors the fault sensing circuits it can momentarily maintain power supply switch Q1 in the CLOSED state for the entire AC voltage cycle if necessary. This will reduce the chance that insufficient power is available near the AC source zero crossing for proper operation of the power supply 30 and the protective circuit 10.

We claim:

1. A thermally efficient protective circuit, for a circuit protection device comprising:
   a connection to a source of AC power;
   a connection to a rectifier for converting the AC power to DC;
   a power supply capacitor for storing a DC voltage;
   a voltage regulator selectively receiving power from one of the rectifier or the power supply capacitor, the voltage regulator supplying regulated power to all components of the protective circuit;
   a power supply switch electrically connected in series between the rectifier and the power supply capacitor for selectively providing power from the rectifier to the power supply capacitor and the voltage regulator, and;
   a microprocessor powered by the regulated power and controlling all functions of the protective circuit including dynamic control of the power supply switch with respect to a lowest point of the AC power source voltage waveform
   wherein the microprocessor initiates closing of the power supply switch at a point near the lowest point on the AC source voltage waveform that will provide the determined minimum time for charging the power supply capacitor when the power supply switch remains closed symmetrically about a zero crossing on the AC source voltage waveform.

2. The protective circuit of claim 1, wherein the microprocessor monitors a charge on the power supply capacitor.

3. The protective circuit of claim 2, wherein the microprocessor monitors the AC source voltage waveform.

4. The protective circuit of claim 3, wherein the microprocessor determines a minimum time required to sufficiently charge the power supply capacitor for operation of the protective circuit.

5. The protective circuit of claim 3, wherein the microprocessor detects fault conditions and voltage sags in the AC power source.

6. The protective circuit of claim 5, wherein the microprocessor determines a minimum time for charging the power supply capacitor based on the detected fault condition or voltage sag and initiates closing of the power supply switch at a point on the AC source voltage waveform that will provide the determined minimum time for charging the power supply capacitor when the power supply switch remains closed symmetrically about the lowest point on the AC source voltage waveform.

7. The protective circuit of claim 1, further including at least one voltage dropping resistor electrically connected between the power supply switch and the rectifier for reducing a voltage applied to the power supply switch and for dissipating heat in the power supply circuit.

8. The protective circuit of claim 1, further including at least one current limiting resistor electrically connected between the power supply switch and the voltage regulator for limiting current in the power supply circuit.

9. The protective circuit of claim 8, wherein a value of the current limiting resistor is selected to limit a maximum current flow through a trip solenoid and the power supply switch.

10. The protective circuit of claim 9, wherein a range of the voltages on both sides of the power supply switch is known and is used to determine the value of the current limiting resistor.

11. A thermally efficient protective circuit, for a circuit protection device comprising:
- a connection to a source of AC power;
- a rectifier for converting the AC power to DC;
- a power supply capacitor for storing a DC voltage;
- a voltage regulator selectively receiving power from one of the rectifier or the power supply capacitor, the voltage regulator supplying regulated power to all components of the protective circuit;
- a power supply switch electrically connected in series between the rectifier and the power supply capacitor for selectively providing power from the rectifier to the power supply capacitor and the voltage regulator;
- at least one voltage dropping resistor electrically connected between the rectifier and the power supply switch for reducing a voltage applied to the power supply switch and dissipating heat;
- a current limiting resistor electrically connected between the power supply switch and the voltage regulator for limiting current flow through the power supply switch, and;
- a microprocessor powered by the regulated power and controlling all functions of the protective circuit including dynamic control of the power supply switch such that the power supply switch is closed symmetrically about a lowest point of the AC power source voltage waveform for a minimum time required to charge the power supply capacitor.

12. A thermally efficient protective circuit, for a circuit protection device comprising:
- a source of AC power;
- a rectifier for converting the AC power to DC;
- a power supply capacitor for storing a DC voltage;
- a voltage regulator selectively receiving power from one of the rectifier or the power supply capacitor, the voltage regulator supplying regulated power to all components of the protective circuit;
- a power supply switch electrically connected in series between the rectifier and the power supply capacitor for selectively providing power from the rectifier to the power supply capacitor and the voltage regulator, and;
- a microprocessor powered by the regulated power and controlling all functions of the protective circuit including dynamic control of the power supply switch such that the power supply switch is closed symmetrically about a zero crossing of the AC power source voltage waveform for a minimum time required to charge the power supply capacitor.

* * * * *